Feb. 25, 1941. H. D. GEYER 2,232,848
FRICTION CLUTCH
Filed March 11, 1939 2 Sheets-Sheet 1

Inventor
Harvey D. Geyer
By Blackmore, Spencer & Clark
Attorneys

Patented Feb. 25, 1941

2,232,848

UNITED STATES PATENT OFFICE 2,232,848

FRICTION CLUTCH

Harvey D. Geyer, Dayton, Ohio, assignor to General Motors Corporation, Detroit, Mich., a corporation of Delaware Application March 11, 1939, Serial No. 261,225

5 Claims. (Cl. 192—68)

This invention relates to friction clutches and has been made as the result of an attempt to improve the releasable clutch by which the engine of a motor vehicle drives the input shaft of the transmission.

The major object of the invention is to provide improved means for resiliently holding a driven disc carried by the clutch driven shaft in engagement with the flywheel of the engine shaft.

More specifically the invention aims to provide resilient means associated with the flywheel, pressure plate and throwout member to accomplish the object sought and to do so without the use of the conventional cover plate which is used to house the pressure plate and which acts as an abutment for the clutch spring.

Other objects and advantages will be understood from the following description.

Figures 1, 2, 3:
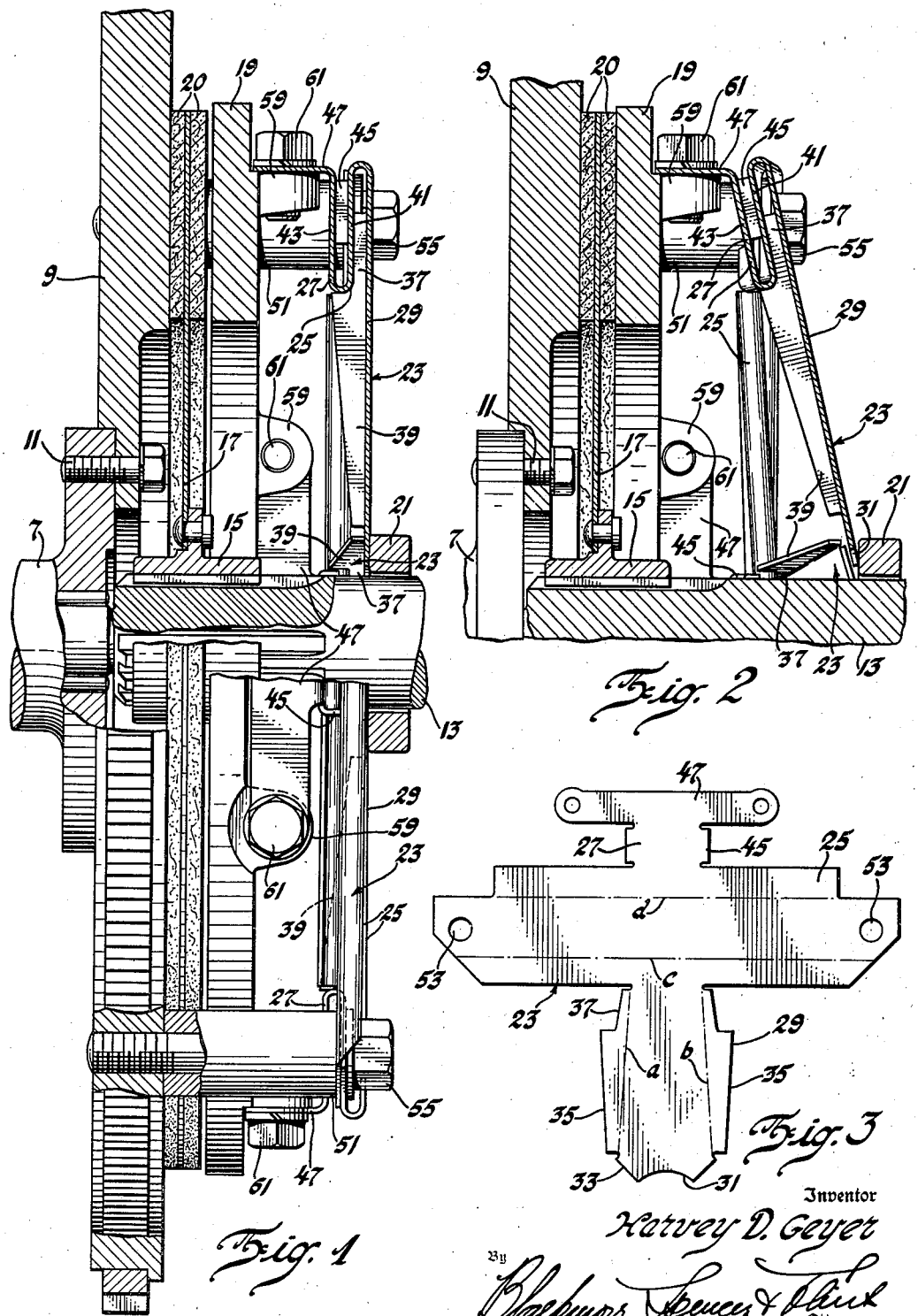
Figure 1 is a transverse section through the improved and simplified clutch, the direction of the view being shown by the arrows associated with the line marked 1—1 of Figure 4.
Figure 2 is a similar section showing the parts displaced from the position shown by Figure 1.
Figure 3 is a blank from which is made an essential part of the device.

On the drawings, numeral 7 represents the engine shaft with the flywheel 9 secured thereto by fastening means 11. Driven shaft 13 is concentric with shaft 7 and carries a hub 15 mounted to rotate with shaft 13. The hub 15 carries a driven plate 17 adapted to be gripped between the flywheel and a pressure plate 19 which rotates jointly with the flywheel but is reciprocable axially relative thereto. The driven plate is provided as usual with facings 20. At 21 is a collar adapted to be reciprocated by any suitable clutch throwout lever not shown.

The invention makes use of no cover for the purpose of a spring abutment, there being a novel form of spring device and spring mounting which constitutes a very simple expedient for positioning and centralizing the essential parts.

Figure 4:
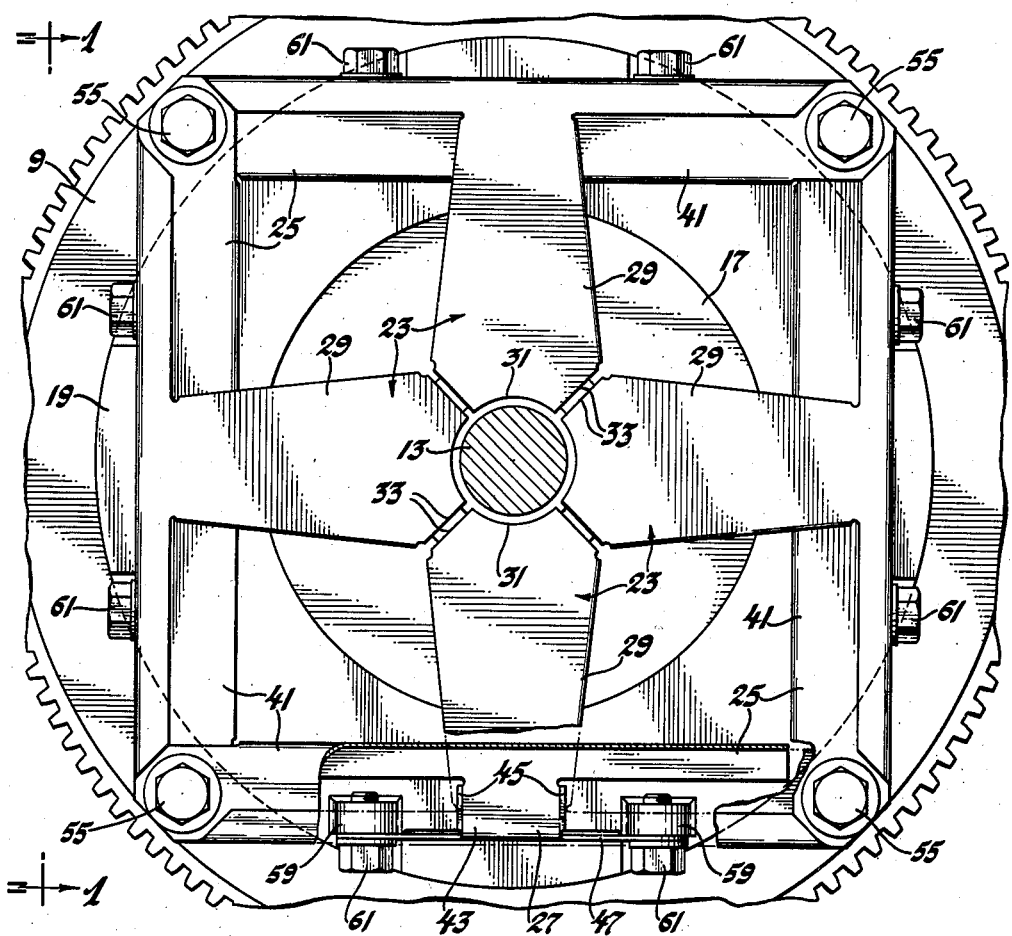
Figure 4 is a view in elevation as seen from the right side of Figure 1.
Figure 5:
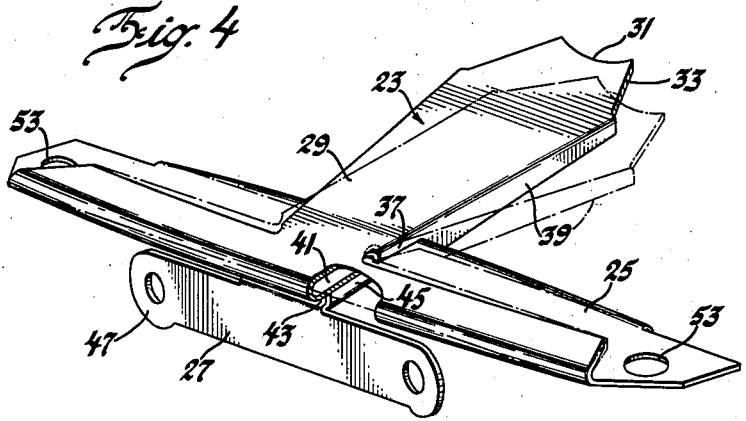
Figure 5 is a perspective of a detail which is made from the blank shown in Figure 3.

The spring device is made by similarly bending and shaping four blanks. Figure 3 shows an outline of one of these blanks. The blank is designated as a whole by numeral 23. It includes an elongated portion 25 from which project arms 27 and 29. Arm 29 terminates in an arcuate marginal wall 31. From wall 31 there diverge walls 33. These walls unite with more nearly parallel walls 35. A reduced end portion having angular walls 37 unites the region 29 with the elongated part 25. The sides of arm 29 are bent angularly along lines marked a and b to form side walls marked 39 in Figure 2. The elongated portion 25 is itself folded to form a U-bend along the line c, thus bringing the part above the line c, beneath and parallel to the plane of part 29. Along the line marked d in part 25 is a second U-bend, the portion above line d being also parallel with the plane of 29 but still further beneath that plane. The plane surfaces thus formed from original parts 25 and 27 are designated at 41 and 43 in Figure 2. In thus folding the material the folded surfaces 41 and 43 are received within the reduced portions of the side walls 39, an arrangement which is seen by reference to Figures 1 and 2. From surface 43 the tongues 45 are bent into contact with surface 41. The surface 47 is bent at an angle to surface 43. There are four corner posts 51 secured symmetrically to and extending rearwardly from the flywheel. The apertures 53 at the ends of surfaces 41 are for securing means 55 used to secure the overlapping ends of these surfaces to the four corner posts and to secure the corner posts to the flywheel. Part 25 is shortened in the region of line d to accommodate the adjacent spring devices when the four spring devices are assembled on the corner posts as shown in Figure 4. The pressure plate is provided with elongated lugs 59 to the ends of which are attached by fastening means 61 the apertured ends of that part of the spring device marked by numeral 47. The end portions of surface 41 at the region of the apertures 53 are twisted from the plane of that portion as will be understood from an examination of Figure 2. This twisting may be thought of as moving the lower part of the surfaces 41 and 43 to the right and as moving the upper parts of these surfaces to the left. This movement of the upper portion 43 is such as to project the attaching region 47 to the left so much so in fact that 47 must be pushed back to some extent to effect the assembly and the attachment of the spring member to the pressure plate and flywheel posts. This is equivalent to producing an initial tension in the spring device operable to maintain the pressure plate in its clutch engaging position. The plane of the mid portion of 41 between the attaching regions may be flattened into the plane of the end portions by a pressure upon the arcuate ends of arms 29, this being accomplished by an appropriate movement of the throwout collar. This flattening of the surface 41 and with it of 43 because of the tongues 45 moves the upper end of arm 27 and with it 47 to the left. In consequence the pressure plate is moved to the right sufficiently to release the clutch.

It will be appreciated that it is quite inexpensive to stamp and bend the four spring members from blanks such as that shown in Figure 3. When such spring members are formed and attached to the flywheel posts and the pressure plate, the clutch is complete. No cover member is required. The drive is transmitted between the flywheel and pressure plate by the use of these four spring devices. The spring devices also, because of their attachment to the flywheel are fixed in position. They position the pressure plate in its relation to the flywheel and driven plate. They provide the resiliency to effect clutch engagement. Without additional means they serve to release the clutch under the influence of pressure applied by the conventional releasing means.

I claim:

1. In a friction clutch having a flywheel, a pressure plate, a driven plate adapted to be gripped therebetween and reciprocable releasing means, yielding means to effect clutch engagement and release and including a plurality of spring devices each having axially spaced cordal portions attached to said flywheel and to said pressure plate and a radial arm actuated by said releasing means, said flywheel having corner posts for the attachment of the ends of the flywheel cordal portion and that part of the flywheel cordal portion between its end attachments being twisted from the plane of its ends thereby to produce an initial tension operable to maintain the pressure plate in clutch engaging position.

2. In a clutch having a flywheel, a pressure plate, and a reciprocable clutch releasing collar, four spring devices one for each quadrant, each spring device having an elongated portion and arms extending oppositely therefrom, said elongated portion formed with two lengthwise extending U bends forming together with one of said arms two substantially parallel plane surfaces, one of said surfaces having ends parallel to each other but bent from the plane of said surface, said ends being secured to the flywheel, one of said arms being attached to the pressure plate and the other arm being adapted to be actuated by the releasing collar.

3. For use in a friction clutch, a spring device formed from a resilient plate having an elongated portion and arms extending oppositely therefrom, the elongated portion having two U-bends forming together with one of said arms two substantially parallel surfaces, one of said surfaces being intermediately twisted from the common plane of its ends, said ends being adapted to be secured to anchoring supports, a first one of said arms adapted to be connected to a movable clutch member and the second of said arms adapted to be moved by a clutch releasing member to flatten out the said twisted region and to reciprocate the clutch movable member.

4. The invention defined by claim 3, said last named arm having side walls, said walls being reduced to receive one of said U-bends.

5. The invention defined by claim 3, said last named arm having side walls, said walls being reduced to receive one of said U-bends, said first arm having axial tongues angularly related thereto and engaging one of said surfaces.

HARVEY D. GEYER.